(12) United States Patent
Shah et al.

(10) Patent No.: US 8,285,966 B2
(45) Date of Patent: *Oct. 9, 2012

(54) AUTONOMIC SELF-TUNING OF DATABASE MANAGEMENT SYSTEM IN DYNAMIC LOGICAL PARTITIONING ENVIRONMENT

(75) Inventors: Punit B. Shah, Portland, OR (US); Nuzio Ruffolo, Markham (CA); Enzo Cialini, Mississauga (CA)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/333,552

(22) Filed: Dec. 21, 2011

(65) Prior Publication Data

US 2012/0110592 A1  May 3, 2012

Related U.S. Application Data

(63) Continuation of application No. 10/983,833, filed on Nov. 8, 2004, now Pat. No. 8,145,872.

(51) Int. Cl.
*G06F 12/00* (2006.01)
*G06F 13/00* (2006.01)
(52) U.S. Cl. ......... 711/173; 711/100; 711/154; 711/170
(58) Field of Classification Search .................. 711/100, 711/143, 154, 170, 173
See application file for complete search history.

(56) References Cited

U.S. PATENT DOCUMENTS

| | | | |
|---|---|---|---|
| 4,930,072 A | 5/1990 | Agrawal et al. | |
| 5,690,194 A * | 11/1997 | Parker et al. | 188/82.1 |
| 6,314,501 B1 * | 11/2001 | Gulick et al. | 711/153 |
| 6,820,095 B1 * | 11/2004 | Yeung et al. | 707/642 |
| 7,028,054 B2 * | 4/2006 | Harper et al. | 1/1 |
| 2002/0194324 A1 | 12/2002 | Guha | |
| 2003/0158884 A1 | 8/2003 | Alford, Jr. | |
| 2003/0177325 A1 | 9/2003 | Jann et al. | |
| 2004/0064673 A1 | 4/2004 | Rogers et al. | |
| 2005/0188075 A1 | 8/2005 | Dias et al. | |

OTHER PUBLICATIONS

P. Shah, "DB2 and Dynamic Logical Partitioning", IBM eServer Developer Domain, <http://www-1.ibm.com/servers/esdd/articles/db-2-dlpar.html>, Apr. 2003, 5 pages.
IBM, "Dynamic Logical Partitioning in IBM (e)server pSeries", Oct. 8, 2002, First Edition, <http://www-03.ibm.com/servers/eserver/pseries/hardware/whitepapers/dlpar.pdf, 13 pages.
A. S. Tanenbaum, "Structured Computer Organization", 1984, Prentice-Hall, Inc., Second Edition, pp. 10-11, ISBN: 0-13-854489.

* cited by examiner

*Primary Examiner* — Tuan V. Thai
(74) *Attorney, Agent, or Firm* — Sterne, Kessler, Goldstein & Fox PLLC

(57) ABSTRACT

An automated monitor monitors one or more resource parameters in a logical partition running a database application in a logically partitioned data processing host. The monitor initiates dynamic logical partition reconfiguration in the event that the parameters vary from predetermined parameter values. In particular, the monitor can initiate removal of resources if one of the resource parameters is being underutilized and initiate addition of resources if one of the resource parameters is being overutilized. The monitor can also calculate an amount of resources to be removed or added. The monitor can interact directly with a dynamic logical partition reconfiguration function of the data processing host or it can utilize an intelligent intermediary that listens for a partition reconfiguration suggestion from the monitor. In the latter configuration, the listener can determine where available resources are located and attempt to fully or partially satisfy the resource needs suggested by the monitor.

17 Claims, 6 Drawing Sheets

AUTONOMIC SELF-TUNING OF DATABASE MANAGEMENT SYSTEM IN DYNAMIC LOGICAL PARTITIONING ENVIRONMENT

This application is a continuation under 35 U.S.C. 120 of application Ser. No. 10/983,833, filed Nov. 8, 2004, entitled "Autonomic Self-Tuning Of Database Management System In Dynamic Logical Partitioning Environment."

BACKGROUND OF THE INVENTION

1. Field of the Invention

This invention relates to database management systems. More particularly, the invention is directed to the implementation of automated tuning for a database management system utilizing the capabilities of a host providing a dynamic logical partitioning environment.

2. Description of the Prior Art

By way of background, autonomic self-tuning (based on system conditions) is a feature of modern database systems. Self-tuning allows various database and database manager parameters to be automatically assigned values based upon current workload and the availability of resources such as CPU (central processing unit) cycles, memory, and I/O (Input/Output). Given a particular workload and resource availability, parameter values are selected that will produce optimal performance.

For example, in a real-time data warehouse environment, it is relatively easy to overload a database server application with too many users, too much memory utilization, and poor caching effects due to the large amount of data being referenced. Thus, as the number of users increases or achieves some threshold value, self-tuning can be used to change the concurrency control optimizations to favor high concurrency.

Finding the optimal performance level in a traditional statically-partitioned operating system environment providing a fixed amount of resources has shortfalls because there is an upper limit placed on how much optimization can be performed within the constraint of currently available resources in a partition. For example, if the workload experienced by a database system requires 1 Gigabyte of memory and a host system has 256 Megabytes of total memory currently available, not much can be done to alleviate the performance problem.

Fortunately, dynamically partitionable data processing systems are available that allow system resources such as CPU bandwidth, memory and I/O to be dynamically assigned to one or more partitions each providing a dedicated operating system environment supporting the execution of one or more applications. Examples of dynamically partitionable systems are the IBM® eServer™ pSeries® servers, such as the p690 and p670 systems, from International Business Machines, running version 5.2 of the IBM® AIX® 5L operating system. This operating system is capable of handling partition reconfiguration without having to be rebooted.

The dynamic logical partitioning capability of the foregoing data processing system allows processor, memory and I/O slot resources to be added to or deleted from running partitions, or moved between running partitions, each of which runs an operating system instance, without requiring any such instance to be rebooted. Both time-based and load-based scenarios for moving processor resources and memory resources among partitions are supported.

It would be desirable to provide a technique whereby a dynamic logical partitioning environment could be used to extend or complement existing database automatic tuning capability. What is needed in particular is a solution in which a database management application can take advantage of a dynamic logically partitioned host to periodically receive resource reallocations as database workload parameters change. Providing such functionality without requiring alteration of the database management program would be of additional benefit.

SUMMARY OF THE INVENTION

The foregoing problems are solved and an advance in the art is obtained by a novel system, method and computer program product for database partition monitoring and dynamic logical partition reconfiguration in support of a tunable database management system. In exemplary embodiments of the invention, an automated monitor monitors one or more resource parameters in a logical partition running a database application in a logically partitioned data processing host. The monitor initiates dynamic logical partition reconfiguration in the event that the parameters vary from predetermined parameter values. The parameters may include one or more of processor load, buffer pool utilization and database client response time, or any other relevant operational characteristic of the logical partition. The monitor can be adapted to initiate removal of resources if one of the resource parameters is being underutilized and to initiate addition of resources if one of the resource parameters is being overutilized. The monitor can be further adapted to calculate an amount of resources to be removed or added.

According to alternative implementations of the invention, the monitor can run in the same logical partition as the database application being monitored, or it could run on a different partition of the data processing host running the database application, or on a different data processing host.

The monitor can interact directly with a dynamic logical partition reconfiguration function of the data processing host or it can be adapted to utilize an intelligent intermediary that listens for a partition reconfiguration suggestion from the monitor. In the latter configuration, the listener can be adapted to respond to the partition reconfiguration suggestion by checking resource availability in a resource free pool of the data processing host. The listener can be further adapted to respond to the partition reconfiguration suggestion and to the free pool not having enough resources by checking resource availability in other logical partitions of the data processing host. The listener can be still further adapted to attempt to partially satisfy the partition reconfiguration suggestion if there are insufficient resources in the free pool and other partitions. In each of the above cases, the listener can respond to the partition reconfiguration suggestion by interacting with the dynamic logical partitioning function associated with the data processing host.

According to alternative implementations of the invention, the listener can run on a logical partition of the data processing host, or it can run on a different data processing host than the database application. If the listener runs on a logical partition of the data processing host, it can be adapted to receive requests for partition reconfiguration from plural monitors running in plural logical partitions of the data processing host. The same is true if the listener runs on a different data processing host than the database application. Alternatively, a single instance of the monitor could run with the listener on the different data processing host.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENTS

Figure 1:
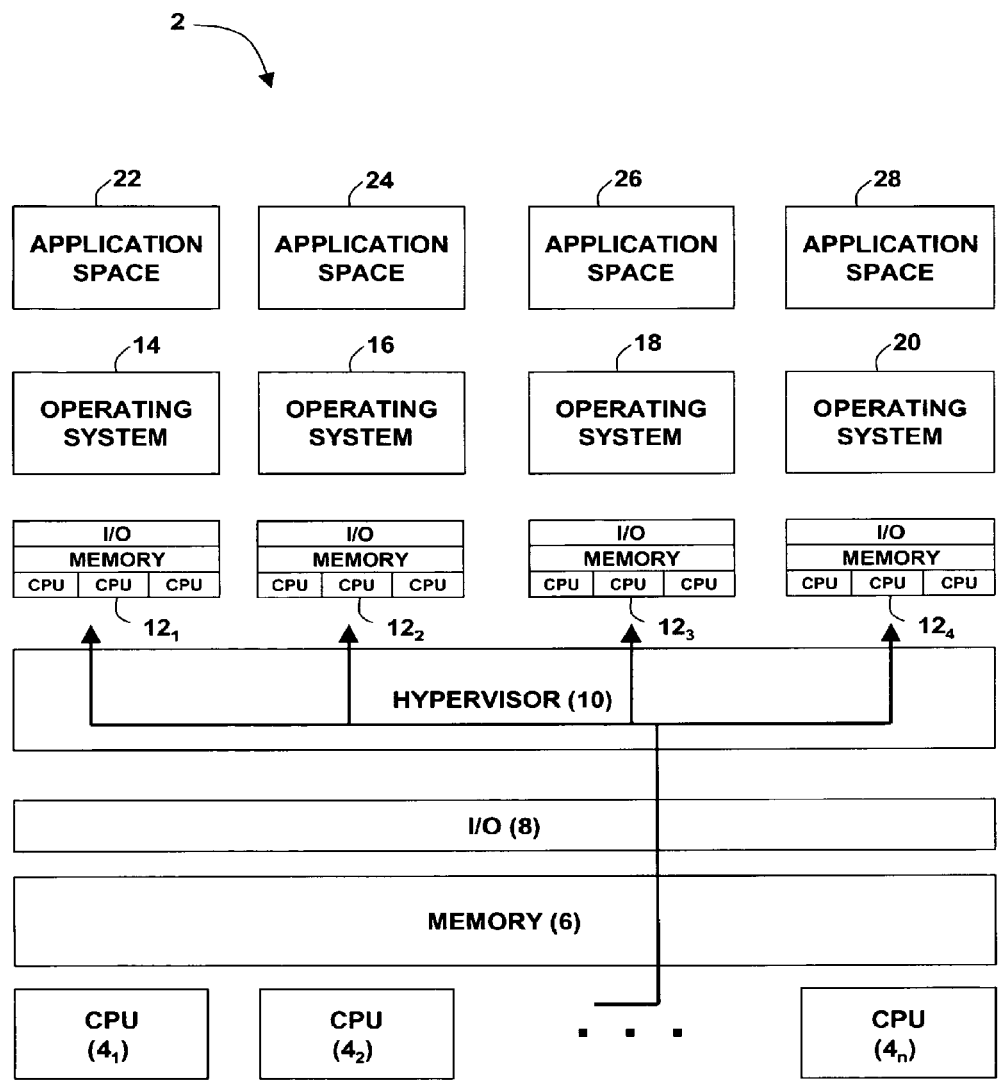
FIG. 1 is a functional block diagram showing an exemplary data processing system with logical partitioning.

The invention will now be described by way of exemplary embodiments shown by the drawing figures, in which like reference numerals indicate like elements in all of the several views.

Turning to FIG. 1, a data processing host system 2 that may be used to implement the invention is configured with a collection of shared data processing hardware resources that include one or more central processing units (CPUs) $4_1$, $4_2$ . . . $4_n$, a memory 6, and a set of input/output (I/O) facilities 8. A hypervisor program 10, also known as a virtual machine monitor or VMM, executes as firmware (or software) on the system 2 to provide logical partitions for various operating system instances and application programs to be described in more detail below. The hypervisor 10 is assumed to be conventional in nature. As such, it can be implemented according to any of the VMM design concepts that have been in use since hypervisors were first developed in the late 1960s (taking into account the VM support capabilities of the underlying hardware). Well known examples of commercial hypervisors include the CP Control Program used in the IBM VM/370® mainframe product introduced by International Business Machines Corporation in 1972, the current z/VM® hypervisor used in the IBM zSeries® mainframe product, and the hypervisor used in IBM pSeries® products. Note that the references to the foregoing commercial products are not intended to suggest that the invention is limited to any particular system or vendor.

As is known to persons skilled in the art, a conventional hypervisor or VMM is a low level service that virtualizes the underlying hardware to provide a subset of the CPU, memory and I/O resources (i.e., a virtual machine) on behalf of higher level "guests." In FIG. 1, the hypervisor 10 is shown to provide four logical partition environments $12_1$, $12_2$, $12_3$ and $12_4$ on behalf of four operating system instances 14, 16, 18 and 20. Each operating system instance 14, 16, 18 and 20, in turn, respectively supports an application space 22, 24, 26 and 28 for running user applications. As described in more detail below, one or more of the user applications could be a database server providing database and database management functions on behalf of one or more database clients (not shown in FIG. 1).

The hypervisor 10 performs various functions that support concurrent operation of the operating systems 14-20 and their applications 22-28 on the system 2. In particular, the hypervisor 10 provides the plural logical partition environments $12_1$, $12_2$, $12_3$ and $12_4$ by allocating CPU bandwidth, memory and I/O resources, for use by each partition. Each operating system 14-20 within a partition $12_1$-$12_4$ behaves as if it were operating on real hardware, with the hypervisor facilitating such operation by (1) translating accesses to virtual memory and I/O space to real memory and I/O space accesses, (2) selectively distributing interrupts from I/O devices to the various operating systems for servicing, and (3) scheduling CPU process execution on a prioritized basis. Note that the operating systems 14-20 need not necessarily be unaware of the hypervisor 10 insofar as there are some operating systems that are designed, for efficiency reasons, to cooperate with a hypervisor. The IBM® AIX® 5L operating system is an example of such a program.

Lastly, and of significance to the present invention, the data processing system 2 supports conventional dynamic logical partitioning, meaning that the partitions $12_1$-$12_4$ can be dynamically reconfigured by adding or removing resources such as processors, memory and I/O slots, or by moving such resources between partitions, without rebooting the operating system instances 14, 16, 18, 20 running therein. As indicated by way of background above, the IBM® AIX® 5L operating system is an example of an operating system that supports dynamic logical partitioning and does not have to be rebooted when partition reconfiguration occurs. A conventional dynamic partitioning API is also provided by the data processing system 2 so that dynamic logical partitioning requests can be made using automated software control.

Figure 2:
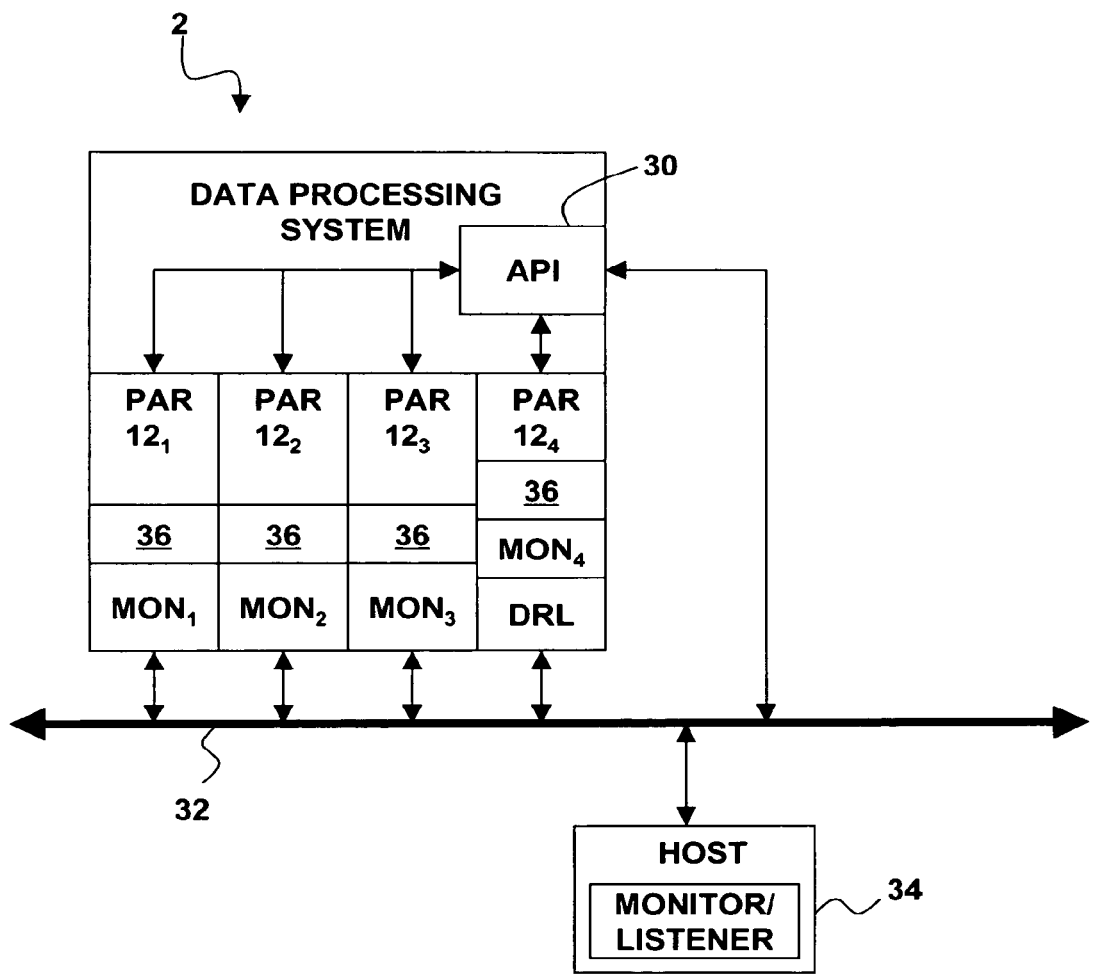
FIG. 2 is a functional block diagram showing another view of the data processing system of FIG. 1.

With additional reference now to FIG. 2, which presents a different view of the data processing system 2 of FIG. 1, reference numeral 30 of FIG. 2 illustrates a dynamic partitioning API that is accessible from each of the partitions $12_1$-$12_4$, as is known in the art. As is further conventionally known, the dynamic partitioning API 30 in the FIG. 2 view of the data processing system 2 also maintains an interface to a network 32 configured as a LAN (Local Area Network) or other communication system. As additionally shown in FIG. 2, the network 32 connects to the partitions $12_1$-$12_4$, and optionally to one or more remote data processing systems, such as a data processing host 34. With this connectivity, the dynamic partitioning API 30 can be accessed from each of the partitions $12_1$-$12_4$, and from other systems, such as the host 34.

As mentioned by way of background above, one example of a data processing platform that provides the foregoing dynamic logical partitioning functionality is the IBM pSeries® line of products, such as the p690 and p670 systems, running the IBM® AIX® 5L operating system. These pSeries® products support a user interface for managing dynamic logical partitioning via a Hardware Management Console (HMC). The HMC allows administrators to manually perform dynamic logical partition reconfiguration. In addition, the software supporting the HMC can be accessed by a component found in version 5.2 of the IBM® AIX® 5L operating system known as the DR (Dynamic Reconfiguration) manager. Each partition running an instance of the IBM® AIX® 5L operating system can issue dynamic logical partitioning requests via its DR manager. Each partition's DR manager is in turn accessible to user applications running in the same partition. Support is also provided for remote secure shell (SSH) execution of dynamic logical partitioning commands sent over a network by software entities running on remote systems. The same kind of local and remote execution support can be provided by the dynamic partitioning API 30 shown in FIG. 2, as could other conventional forms of command interaction.

Figure 3:
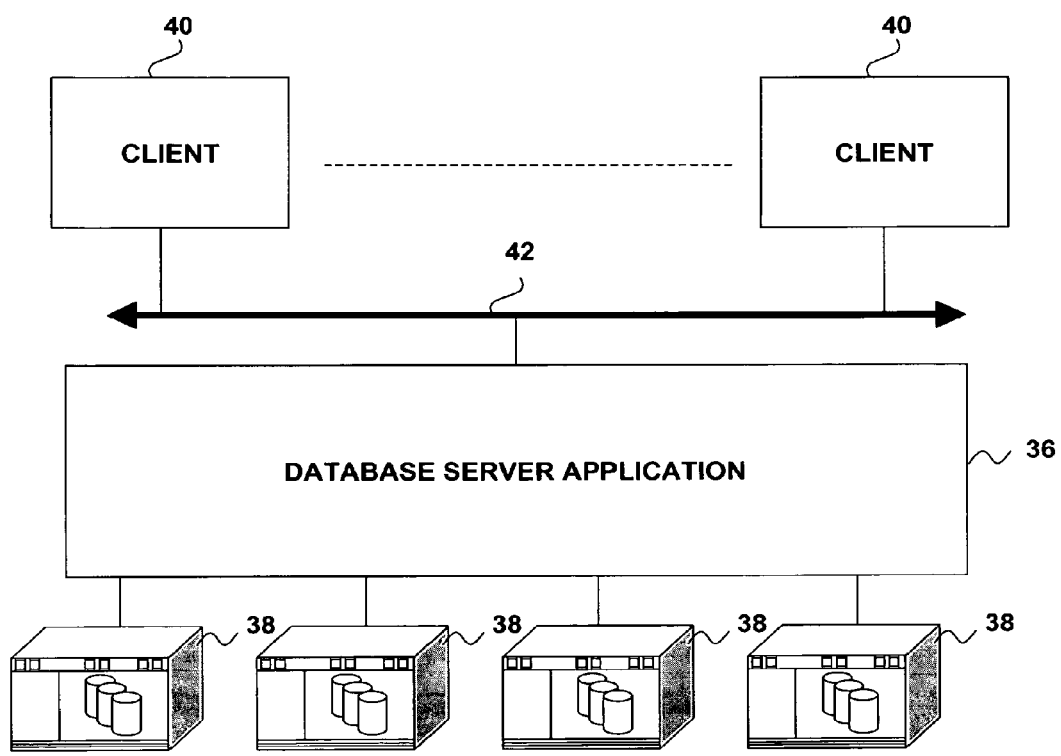
FIG. 3 is a functional block diagram showing an exemplary database server application running on the data processing system of FIG. 1 to provide a database management system on behalf of database clients.

Turning now to FIG. 3, a database server application 36 is shown that provides database and database management functions for data resident on one or more data storage subsystems 38. For purposes of example only, it is assumed that there are four of the data storage subsystems 38, and that these subsystems are respectively associated with four instances of the database server application 36. Each instance of the database server application 36 is assumed to respectively run in one of the application spaces 22, 24, 26 and 28 shown in the FIG. 1 view of the data processing system 2. Each such instance could operate separately to implement an independent database on one of the data storage subsystems 38, or alternatively, each instance could be configured to operate cooperatively with other instances to provide a single distributed database. As is conventionally known, a distributed database can be distributed over multiple physical or logical partitions to facilitate parallel processing on defined subsets of data. In the context of the data processing system 2, one instance of the database server application 36 could be installed on each logical partition to collectively provide a distributed database with four partitions (with additional instances physically partitioned on other data processing hosts also being possible).

The database server application 36 is conventionally adapted to communicate with one or more clients 40 issuing database query requests by way of a network 42, which could be the same as or different than the network 32 of FIG. 2. The database server application 36 services these client query requests by invoking appropriate database query functions, and returning the query results to the requesting client(s), as is conventional.

The programming in the database server application 36 is assumed to implement the usual set of database and database management functions. These include, but are not necessarily limited to, various transaction management functions, scheduling functions and data management functions, including but not limited to query optimization, scan processing, join processing, aggregation processing, sort processing, convergence processing, final result set processing, logging, recovery, index management, concurrency control, buffer pool management, and parallel query processing.

The database server application 36 may need to accommodate a variety of clients 40 issuing potentially diverse types of database query requests. These requests could include routine online transaction processing (OLTP) queries in which relatively few database records need to be processed with subsecond response time. The clients 40 could also issue, on an ad hoc basis, processor-intensive decision support system (DSS) requests requiring hours to complete.

To support such query diversity, the database server application 36 is assumed to possess autonomic self-tuning functionality of the type found in modern database management systems. As indicated by way of background above, self-tuning allows various database and database manager parameters to be automatically assigned values based upon current workload and the availability of resources such as CPU (central processing unit) cycles, memory, and I/O (Input/Output). Given a particular workload and resource availability, parameter values are selected that will produce optimal performance.

Version 8 of the IBM® DB2® Database Manager product is one example of a database program that may be used to implement the database management server application 36. Tunable parameters associated with database management operations of this partitioned database product include: 1) maximum number of parallel operations per SQL statement; 2) partition memory available for database server application instance management; 3) number of inter-partition communications buffers; 4) processor speed per instruction; 5) inter-partition communications bandwidth; 6) system monitor switches; and 7) index recreation scheduling. With respect to storage and integrity of the database itself (as opposed to database management), tunable parameters in the IBM® DB2® Database Manager product include: 1) catalog cache size; 2) utility heap size; 3) database heap size; 4) sort heap size; 5) statement heap size; 6) degree of intra-partition parallelism; 7) table space extent size; 8) extent prefetch size; 9) average number of active applications; 10) maximum number of active applications; 11) package cache size; 12) maximum storage for lock list; 13) maximum number of locks; 14) default query optimization class; and 15) number of commits per commit group.

It will be appreciated that other database programs could be used to implement the database server application 36. Thus, the foregoing listing of tunable parameters associated with the IBM® DB2® Database Manager product are set forth for the purpose of illustration only, and not by way of limitation.

As indicated by way of summary above, the present invention allows whatever autonomic self-tuning functions that may be present in the database server application 36 to be extended and complemented using the dynamic partitioning functions of the data processing system 2. This is accomplished by 1) defining (at application deployment time) one or more desired operational parameters relating to application level resource utilization and/or operating system level performance, 2) monitoring the defined parameters during application execution; and 3) performing dynamic logical partition reconfiguration as necessary if the parameters are violated.

Each instance of the database server application 36 has an associated set of defined parameters that may be referred to as a Service Level Agreement or SLA. There is one SLA associated with each database server application instance, and each SLA can define any number of different parameters. By way of example only, and not by way of limitation, an SLA associated with one (or more) instances of the database server application 36 might specify the following parameters:

1) Processor load should be in a range 80%-90% on partition;
2) Database buffer pool hit ratio should be >95%;
3) Database client response time should be <5 seconds;
4) . . . . [Others].

An SLA can be continuously (or periodically) monitored and whenever one of its parameters is violated, as by the parameter going outside of a defined range for a specified period of time, the associated partition can be dynamically reconfigured. For example, using the exemplary SLA above, if the current processor load for a partition is 99% for five minutes, the partition could be reconfigured by adding a new processor to keep the processor load at or under 90%. Similarly, for database buffer pools, a partition could be reconfigured by adding additional memory if the current buffer pool hit ratio is, for example, 50% for two minutes. The same is true for processor/memory removal. If there is processor under-utilization and unused buffer pool pages in a partition, a processor and memory could be removed from the partition and placed in a free pool. These resources would then be available in the future to the same partition or to other partitions that need them. Note that when partition resources are not available in the free pool, they can be obtained from one or more other partitions that are not as resource sensitive or are defined as lower priority SLA partitions. A partition priority and arbitration mechanism can be used to implement such reallocations.

The monitoring function for monitoring the SLAs associated each instance of the database server application 36 can be provided by a monitor running as a thread, process or other execution context in a partition that concurrently runs a database server application instance (or in any other partition). For example, as shown in FIG. 2, if partitions $12_1$, $12_2$, $12_3$ and $12_4$ each run an instance of the database server application 36, there could be a monitor $MON_1$, $MON_2$, $MON_3$ and $MON_4$ respectively running on each partition. Each monitor can be implemented to run in either operating system kernel mode or user application mode. However, it will be appreciated that the latter requires no operating system modifications and thus may be less costly to implement.

As indicated above, each of the monitors $MON_1$, $MON_2$, $MON_3$ and $MON_4$ can track conditions associated with the SLA parameters of the database server application instance running in its partition, and initiate responsive action whenever a parameter is violated. This responsive action involves notifying the dynamic partitioning API 30 that partition reconfiguration is required. Although it would be possible for each monitor to provide such notification directly to the dynamic partitioning API 30, efficiency can be improved by providing an intelligent intermediary that controls the manner in which dynamic reconfiguration requests are made to the dynamic partitioning API 30. In an exemplary embodiment of the invention, this intelligence is provided by a dynamic reconfiguration (DR) suggestion listener that can run as a thread, process or other execution context on one of the partitions $12_1$, $12_2$, $12_3$ and $12_4$. In FIG. 2, the dynamic reconfiguration listener (DRL) is shown by way of example only to run on the partition $12_4$. Its function is to receive dynamic reconfiguration suggestions from the monitors $MON_1$, $MON_2$, $MON_3$ and $MON_4$ and then determine what dynamic reconfiguration requests need to be made to the dynamic partitioning API 30. Communication between the listener DRL and the monitors $MON_1$, $MON_2$, $MON_3$ and $MON_4$ can be implemented over the network 32, or by way of a conventional inter-partition communication mechanism provided by the data processing system 2, if present.

The discussion of FIG. 4 below will illustrate the kind of decision making that can be performed by the listener DRL following the receipt of dynamic reconfiguration suggestions from the monitors $MON_1$, $MON_2$, $MON_3$ and $MON_4$. However, before turning to FIG. 4, it should be pointed out with reference to FIG. 2 that the illustrated arrangement in which the monitors $MON_1$, $MON_2$, $MON_3$ and $MON_4$ and the listener DRL are installed on the various partitions of the data processing system 2 is not the only way that these functions can be implemented. As further shown in FIG. 2, all monitor and listener functions could be implemented on the host 34, due to that system's ability to communicate with each partition of the data processing system 2, as well as the dynamic partitioning API 30, via the network 32. Relatedly, all of the monitor and listener functions could likewise be implemented on a single one of the partitions $12_1$, $12_2$, $12_3$ and $12_4$ of the data processing system 2.

Figure 4A:
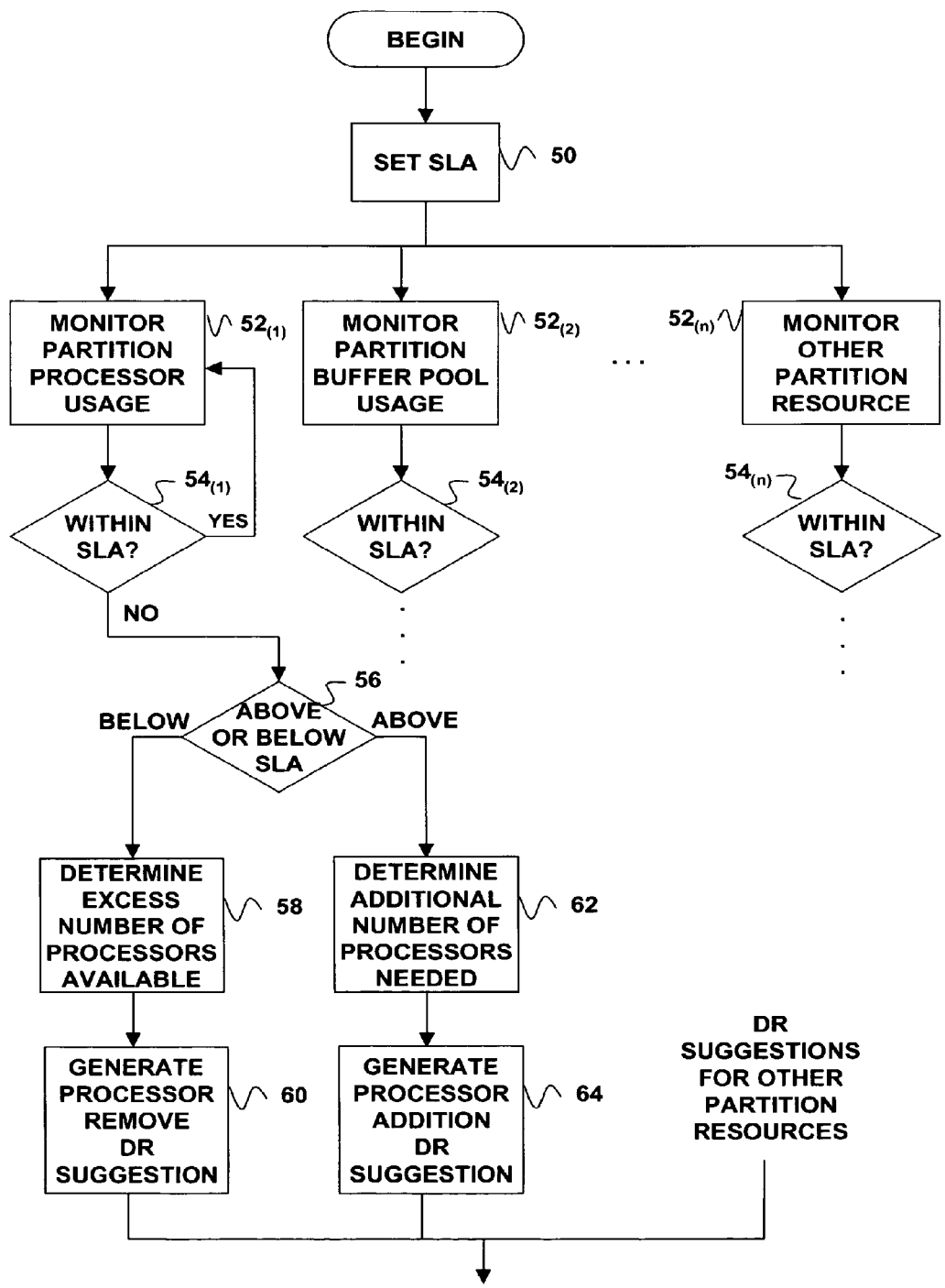
FIGS. 4A and 4B collectively represent a flow diagram showing exemplary processing steps for performing database partition monitoring and dynamic logical partitioning in support of a tunable database management system.
Figure 4B:
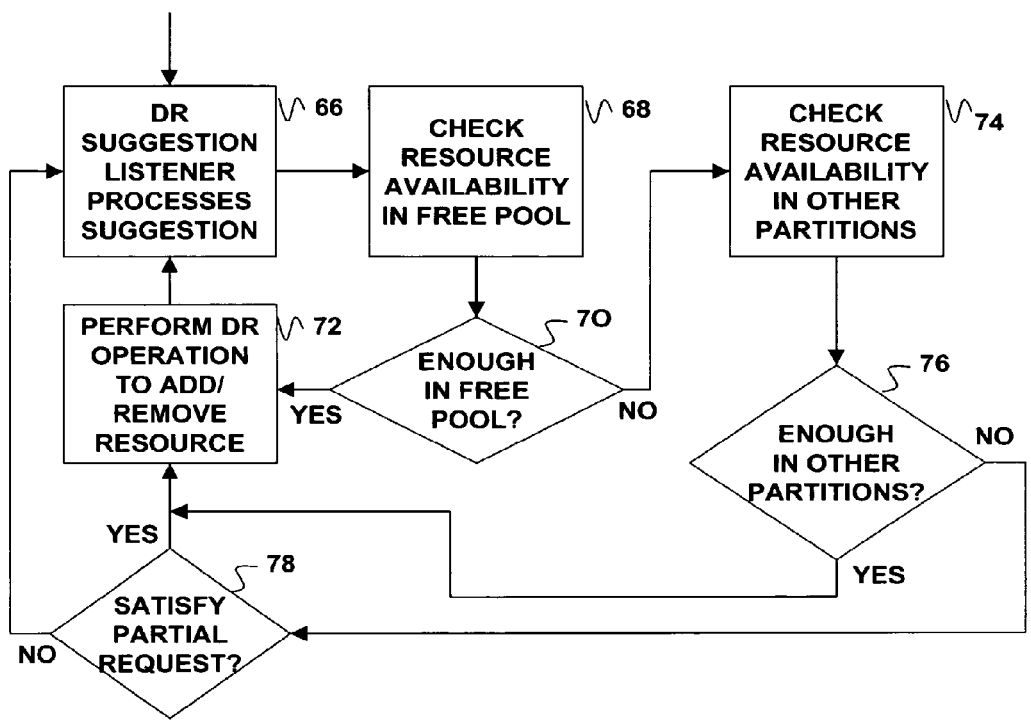

Turning now to FIGS. 4A and 4B, the illustrated flow diagram represents exemplary processing steps that may be performed in accordance with the invention to support autonomic self-tuning of a database management system in a dynamic logically partitioned environment. In a first step 50, an SLA for a database server application 34 running on the data processing system 2 is accessed by a monitor of the type described above. In step 52, the monitor continuously (or periodically) monitors the partition resources defined in the SLA. In FIG. 4A, this includes the monitoring of processor usage in step $52_{(1)}$, the monitoring of buffer pool usage in step $52_{(2)}$, and the monitoring of one or more other partition resources, as shown by step $52_{(n)}$. Note that all monitoring of partition resources can be performed using conventional operating system calls of the type provided by most modern operating systems. In step 54, the monitor determines whether the partition resources being monitored are consistent with the corresponding SLA parameters. In FIG. 4A, this includes determining whether processor usage is within the corresponding SLA processor usage parameter in step $54_{(1)}$, whether buffer pool usage is within the corresponding SLA buffer pool parameter in step $54_{(2)}$, and performing similar evaluations for one or more other partition resources being monitored, as shown by step $54_{(n)}$. If an SLA parameter is not found to be violated in step 54, processing returns to step 52. If an SLA parameter is found to be violated in step 54, a test is made in step 56 to determine whether the corresponding processor resource is above or below the SLA parameter value. For example, in FIG. 4A, the illustrated decision box for step 56 represents a determination by the monitor as to whether partition processor resources are being underutilized or over utilized. The monitor then performs suggestion processing, as exemplified by the remaining steps of FIG. 4A, to determine an appropriate DR suggestion to be made to a listener of the type described above. Steps 58 and 60 are performed if processor usage is below the SLA parameter. In step 58, the monitor determines the number of processors that the partition has available to send to a free pool of resources maintained by the data processing system 2. Conventional linear interpolation/extrapolation algorithms are available to make the processor availability determination. For example, if a partition has four running processors and processor usage is 40%, donating two processors should boost processor usage to a more efficient 80%. Note that the concept of a free pool for logically cataloging available resources is a well-known feature of dynamic logical partitioning environments. In step 60, the monitor generates a DR suggestion to the listener for processor removal using the number of processors determined in step 58. Steps 62 and 64 are performed if processor usage is above the SLA parameter. In step 62, the monitor determines the number of processors needed by the partition. Again, conventional linear interpolation/extrapolation algorithms are available to make this determination. For example, if a partition has four running processors and the processor usage is 100%, acquiring one more processor will reduce processor usage to 80%. In step 60, the monitor generates a DR suggestion to the listener for processor addition using the number of additional processors determined in step 58. Although not shown in FIG. 4A, similar processing is performed in connection with other partition resources being monitored.

As shown in FIG. 4B, the DR suggestion is processed by the listener in step 66. If the DR suggestion involves removing resources from the partition issuing the DR suggestion, this is accomplished without further processing by the listener issuing an appropriate remove request to API 30 of FIG. 2. If the DR suggestion involves adding resources to the partition issuing the DR suggestion, the listener issues an appropriate call to the API 30 in step 68 to determine the availability of resources in the free pool of unassigned resources maintained by the data processing system 2. Based on the response from the API 30, the listener determines in step 70 whether there are enough of the requested resources in the free pool. If enough resources are available, step 72 is performed in which the listener requests the API 30 to add the requested resources. If there are not enough resources in step 70, step 74 is performed in which the listener determines the availability of resources in other partitions. This is done by issuing conventional queries to the operating systems in these partitions. In step 76, the listener evaluates the responses received from the partition(s) being queried and determines whether there are available resources that can be borrowed. If there are, step 72 is invoked and the listener requests the API 30 to deliver the required resources from the other partition(s) in which the resources are available. If there are not enough resources available in other partitions, the listener performs step 78 to determine whether there are enough resources to partially satisfy the DR suggestion. If there are, the listener requests the API 30 to deliver whatever partial resource requirement can be obtained from the other partitions. If it is determined in step 78 that a partial request cannot be satisfied, processing returns to step 66.

Note that the decision making of steps 76 and 78 can involve arbitration by the listener to determine the partitions that are the most likely candidates to give up resources. This arbitration can be based on the evaluation of factors such as partition priority, partition resource sensitivity, SLA priority, etc. Thus, by way of example only, if all partitions lack extra resources, or are perhaps even low on resources, one or more partitions with the lowest ranking(s) according to the factors being evaluated could be selected to satisfy some or all of the resource needs of a requesting partition with higher priority.

Figure 5:
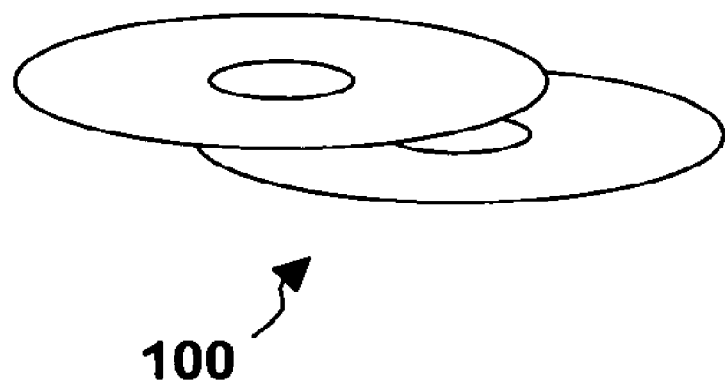
FIG. 5 is a diagrammatic illustration of storage media that can be used to store a computer program product for implementing functions in accordance with the invention.

Accordingly, a database partition monitoring and reconfiguration system for supporting an autonomic self-tuning database management system running in a dynamic logical partitioning operating system environment has been disclosed. It will be appreciated that the inventive concepts may be variously embodied in any of a data processing system, a machine implemented method, and a computer program product in which programming means are recorded on one or more data storage media for use in controlling a data processing system to perform the required functions. Exemplary data storage media for storing such programming means are shown by reference numeral 100 in FIG. 5. The media 100 are shown as being portable optical storage disks of the type that are conventionally used for commercial software sales. Such media can store the programming means of the invention either alone or in conjunction with an operating system or other software product that incorporates read-copy update functionality. The programming means could also be stored on portable magnetic media (such as floppy disks, flash memory sticks, etc.) or on magnetic media combined with drive systems (e.g. disk drives) incorporated in computer platforms. While several embodiments of the invention have been shown and described, it should be apparent that many variations and alternative embodiments could be implemented. It is understood, therefore, that the invention is not to be in any way limited except in accordance with the spirit of the appended claims and their equivalents.

What is claimed is:

1. A database partition monitoring and reconfiguration system comprising:
one or more central processing units;
a memory operatively coupled to said one or more central processing units;
said memory storing program logic that runs in an execution context of said one or more central processing units to implement an automated monitor adapted to monitor one or more database application-level resource parameters in a logical partition running a database application in a logically partitioned data processing host, said resource parameters being defined by said database application and including tunable database parameters that are associated with database management operations or database storage and integrity, to determine partition resources to be reallocated based on said resource parameters, said partition resources being different from said resource parameters but utilized by said database application to operate according to said resource parameters, and to initiate dynamic logical partition reconfiguration to reallocate said resources in the event that said resource parameters vary from predetermined parameter values.

2. A system in accordance with claim 1 wherein said resource parameters are specified in a service level agreement associated with said database application and include buffer pool utilization and database client response time.

3. A system in accordance with claim 1 wherein said monitor is adapted to initiate removal of said resources if one of said resource parameters is being underutilized and to initiate addition of resources if one of said resource parameters is being overutilized.

4. A system in accordance with claim 3 wherein said monitor is adapted to calculate an amount of said resources to be removed or added.

5. A system in accordance with claim 1 wherein said monitor runs in the same logical partition as said database application.

6. A system in accordance with claim 1 wherein said monitor runs in a different logical partition or on a different data processing host than said database application.

7. A system in accordance with claim 1 wherein said system further includes a listener and wherein said monitor is adapted to suggest partition reconfiguration to said listener.

8. A system in accordance with claim 7 wherein said listener is adapted to respond to said partition reconfiguration suggestion by checking resource availability in a resource free pool of said data processing host.

9. A system in accordance with claim 8 wherein said listener is adapted to respond to said partition reconfiguration suggestion and to said free pool not having enough resources by checking resource availability in other logical partitions of said data processing host.

10. A system in accordance with claim 9 wherein said listener is adapted to attempt to partially satisfy said partition reconfiguration suggestion if there are insufficient resources in said free pool and other partitions.

11. A system in accordance with claim 10 wherein said listener is adapted to arbitrate to determine which of said other partitions will be used to fully or partially satisfy said partition request.

12. A system in accordance with claim 7 wherein said listener runs on one of a logical partition of said data processing host and a different data processing host than said database application.

13. A system in accordance with claim 7 wherein said listener runs on a logical partition of said data processing host and is adapted to receive partition reconfiguration suggestions from plural ones of said monitor running in plural logical partitions of said data processing host.

14. A system in accordance with claim 7 wherein said listener runs with said monitor on a different data processing host than said database application.

15. A system in accordance with claim 7 wherein said listener is adapted to respond to said partition reconfiguration suggestion by interacting with a dynamic logical partitioning function associated with said data processing host.

16. A database partition monitoring and reconfiguration system, comprising:
one or more central processing units;
a memory operatively coupled to said one or more central processing units;
said memory storing program logic that runs in an execution context of said one or more central processing units to implement;

monitoring means for monitoring one or more database application-level resource parameters in a logical partition running a database application in a logically partitioned data processing host, said resource parameters being defined by said database application and including tunable database parameters that are associated with database management operations or database storage and integrity;

suggestion means associated with said monitoring means for determining partition resources to be reallocated based on said resource parameters and for suggesting dynamic logical partition reconfiguration in the event that said parameters vary from predetermined parameter values, said partition resources being different from said resource parameters but utilized by said database application to operate according to said resource parameters; and listener means for determining how suggestions for reconfiguration from said suggestion means can be handled and for interacting with a dynamic logical partitioning function associated with said data processing host to implement said suggestions.

17. A database partition monitoring and reconfiguration system, comprising:

one or more central processing units;

a memory operatively coupled to said one or more central processing units;

said memory storing program logic that runs in an execution context of said one or more central processing units to implement;

monitoring means for monitoring one or more database application-level resource parameters in a logical partition running a database application in a logically partitioned data processing host, said resource parameters being defined by said database application and including tunable database parameters that are associated with database management operations or database storage and integrity;

suggestion means for determining partition resources to be reallocated based on said resource parameters and for requesting dynamic logical partition reconfiguration in the event that said parameters vary from predetermined parameter values; and listener means for receiving requests for partition reconfiguration from said suggestion means and for 1) checking resource availability in a resource free pool of said data processing host, 2) checking resource availability in other logical partitions of said data processing host in response to said free pool not having enough resources, and 3) attempting to partially satisfy said request for partition reconfiguration in response to said free pool and other partitions not having enough resources.

* * * * *